United States Patent [19]

McColgan

[11] 4,381,142
[45] Apr. 26, 1983

[54] REAR VIEW MIRROR ATTACHMENT

[76] Inventor: Christopher McColgan, P.O. Box 249, Quyon, Quebec, Canada, J0X 2V0

[21] Appl. No.: 206,079

[22] Filed: Nov. 12, 1980

[30] Foreign Application Priority Data

Oct. 14, 1980 [CA] Canada ............................. 362106

[51] Int. Cl.³ .............................................. B60R 1/08
[52] U.S. Cl. ...................................... 350/304; 350/300
[58] Field of Search ....................... 350/282, 300, 304; 132/79 G, 80 A, 83 A, 83 E

[56] References Cited

U.S. PATENT DOCUMENTS

| 1,276,512 | 8/1918 | Faure | 350/304 |
| 1,578,629 | 3/1926 | Beauchamp | 350/304 |
| 2,214,639 | 9/1940 | Lenta | 350/304 |
| 2,503,163 | 4/1950 | Maddox | 132/83 E |
| 2,802,394 | 8/1957 | Krone | 350/304 |
| 2,814,970 | 12/1957 | Ogle, Jr. | 350/282 |
| 3,048,084 | 8/1962 | Iannuzzi | 350/304 |
| 3,790,117 | 2/1974 | Winkler | 350/304 |
| 4,019,812 | 4/1977 | Carnine | 350/304 |

FOREIGN PATENT DOCUMENTS 210915 4/1921 Canada .
213570 9/1921 Canada .

Primary Examiner—F. L. Evans
Attorney, Agent, or Firm—Armstrong, Nikaido, Marmelstein & Kubovcik

[57] ABSTRACT

An auxiliary mirror for attachment to the main rear-view mirror of a vehicle. The auxiliary mirror comprises a flat mirror device having a front and a back mirror surface and a hinge member extending along the upper edge of the mirror device. The mirror device is pivotally mounted on the hinge member so that the mirror device can be pivoted from a first position where the front mirror surface is viewed to a second position where the back mirror surface is viewed. A mechanism is provided for connecting the hinge member to the main mirror. When the auxiliary mirror is placed in the first position, it offers a view to the rear and to the right of the vehicle, a location which would normally be a blind spot. When the auxiliary mirror is raised to the second position, it can be used to provide an improved view of the roadway directly behind the vehicle. The latter improved view is desirable for backing up the vehicle.

13 Claims, 6 Drawing Figures

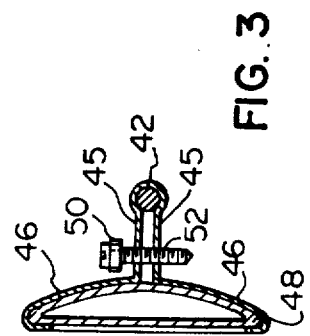
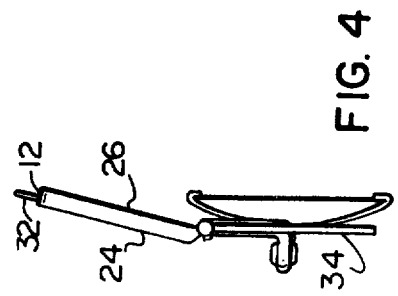
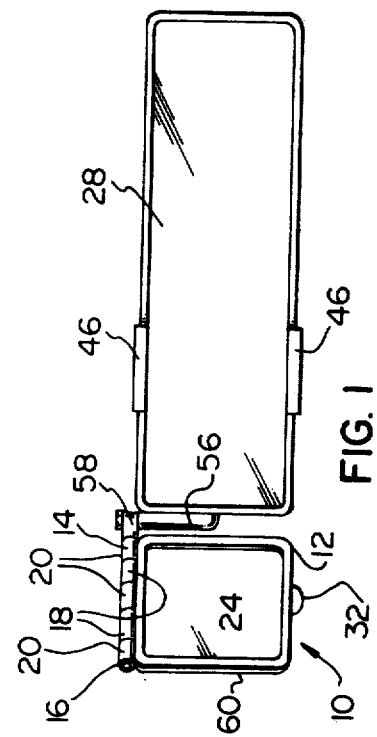
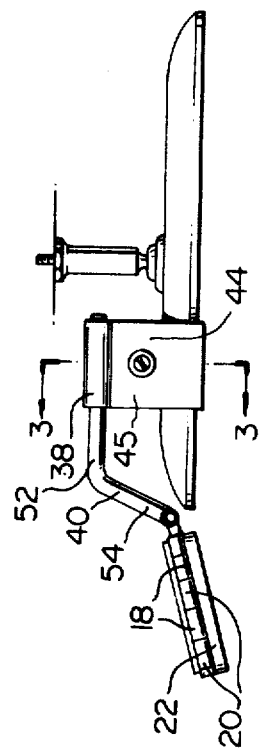

REAR VIEW MIRROR ATTACHMENT

BACKGROUND OF THE INVENTION

This invention relates to an auxiliary mirror particularly suited for use in cars and trucks. It is known to provide auxiliary mirrors or mirror attachments for use in association with an existing rearview mirror in a vehicle such as a truck or car. One of the primary reasons for providing such mirrors in the past has been to eliminate one or more blind spots that can not normally be seen by a driver using an ordinary rearview mirror. For example, U.S. Pat. No. 3,048,084 issued Aug. 7, 1962 to H. J. Iannuzzi teaches an auxiliary mirror that is attached by means of a clamping mechanism to the main rearview mirror. The auxiliary mirror is mounted on the horizontally extending rod which has a ball and socket joint at its lefthand end where the rod connects to the auxiliary mirror. This joint permits the plane of the auxiliary mirror to be placed at an angle relative to the plane of the main mirror.

A very recent U.S. Pat. No. 4,019,812 issued Apr. 26, 1977 to Elmo Carnine also teaches the use of auxiliary mirrors that can be connected to a vehicle's standard mirror for increasing the driver's vision. In this patent specification, the auxiliary mirrors are arranged either above or below the main mirror. Carnine teaches the mounting of two separate auxiliary mirrors on a single vertical pivot post. In the various embodiments taught by this specification, it is not possible to pivot the plane of the auxiliary mirrors about a horizontal axis.

One disadvantage of the commonly used rearview mirrors for vehicles and a disadvantage which can not be overcome with the auxiliary mirrors that have been used in the past is that of not providing an adequate view of the roadway and region located directly behind the vehicle for purposes of backing up the vehicle. With the commonly used rearview mirrors, there is a considerable distance extending rearwardly from the back end of the car which can not be seen by the driver both because of the position of the main mirror and the fact that the rear end of the car is blocking out a view of this region. Because of this problem with rearview mirrors, accidents occurring during the backing up of a vehicle are quite common and indeed such accidents can be very serious indeed if the object that is struck is a small child. Dogs and cats can also be struck quite easily if they stray behind the car after the driver has seated himself. Less serious accidents can also be caused by persons leaving objects on the driveway or road which are not seen by the driver when he backs up. The object itself can be damaged or destroyed or it can cause costly damage to the vehicle.

Accordingly, it is an object of the present invention to provide an apparatus for providing a rearview which can be used to improve the view of a driver in the area directly behind the vehicle as it is being backed up.

It is a further object of the present invention to provide a mirror device which has a dual function, the first being to eliminate a blind spot to the side of the car as it is being driven in a forward direction and the second being to improve the view of the driver immediately behind the car as it is being backed up.

SUMMARY OF THE INVENTION

Accordingly, the apparatus of the invention for providing a rear view comprises a flat mirror device having a front and a back mirror surface and a hinge member extending along one edge of the mirror device. Means are provided for pivotably mounting the mirror device on the hinge member whereby the mirror device can be pivoted from a first position where the front mirror surface is viewed to a second position where the back mirror surface is viewed. Further means are provided for connecting the hinge member to a support such as a main rearview mirror.

In the preferred embodiment disclosed herein, an opaque panel member is rigidly connected to the hinge member and is arranged to cover the back surface when the mirror device is in the first position. The hinge member is preferably connected to the support by means of a clamping mechanism adapted to clamp onto the top and bottom edges of the support or rearview mirror.

Reference will now be made to the accompanying sheets of drawings wherein a preferred embodiment of the invention and the operation thereof is illustrated.

BRIEF DESCRIPTION OF THE DRAWINGS

FIG. 1 is a front view of an auxiliary mirror constructed in accordance with the present invention and attached to a main rearview mirror;

FIG. 2 is a top view of the auxiliary mirror and main mirror shown in FIG. 1;

FIG. 3 is a sectional view taken along the line 3—3 shown in FIG. 2;

FIG. 4 is a left end view of the auxiliary mirror and main mirror shown in FIG. 1 but with the auxiliary mirror pivoted to an upper position;

DETAILED DESCRIPTION OF PREFERRED EMBODIMENT

Figure 5:
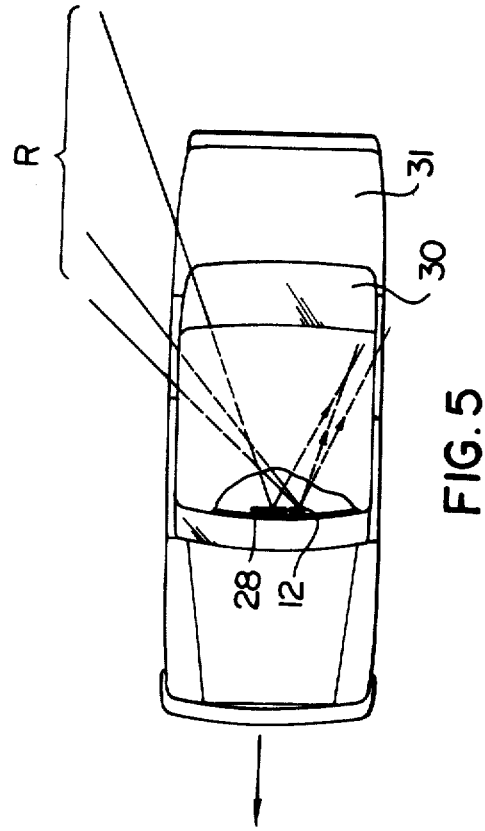
FIG. 5 is a diagrammatic illustration showing the function of the auxiliary mirror during normal driving in a forward direction.

As shown in FIG. 1, the apparatus 10 of the invention for providing a rear view includes a flat mirror device 12 and a hinge member 14 extending along one edge of the mirror device. A suitable mechanism is provided for pivotably mounting the mirror device on the hinge member 14 whereby the device 12 can be pivoted from a first position shown in FIG. 1 to a second position which is shown in FIG. 4. This mechanism can include a standard hinge pin 16 and a couple of hollow cylinder mounts 18 which are rigidly attached to the top edge of the mirror device 12. On opposite sides of each cylinder mount 18 are further hollow cylinders 20 which are part of the hinge member 14. The hinge pin 16 extends through the two cylinder mounts 18 and the three cylinders 20. It will be appreciated that the three cylinders 20 are integrally connected together by means of a rear element 22.

The mirror device 12 has a front mirror surface 24 and a back mirror surface 26. When the mirror device 12 extends downwardly from the hinge member as shown in FIG. 1, the front surface 24 can be seen by the driver and with the use of this mirror surface the driver can see behind him in the region to his right as illustrated in FIG. 5. FIG. 5 outlines a region R which normally can not be seen by a driver looking into an ordinary rearview mirror 28. Mirror 28 is only able to provide the driver with a view of the area behind the car, that is, the view which is seen through the rear window 30 of the car 31. As already indicated, it is known to provide auxiliary mirrors which will provide a driver with a good view of the normally blind area on the right side of the car.

The apparatus 10 of the present invention serves a dual function and thus provides a distinct advantage over known auxiliary mirrors. Not only can the apparatus 10 provide a view of the blind area to the rear and to the right of the driver but it can provide an increased viewing area in the region directly behind the car for purposes of backing up the car. In order that the apparatus can serve this second purpose, the back surface of the device 12 is also a mirror surface. This back surface 26 is exposed by pivoting the mirror device to the position shown in FIG. 4. To assist in the pivoting of the mirror device, a tab 32 can be provided on the bottom edge. Alternatively the tab might be provided on the left hand edge of the device 12.

Because the back surface 26 is a mirror surface, it is preferable to provide an opaque panel member 34 to cover the back surface when the mirror device is in the position shown in FIG. 1. This panel member can be rigidly connected to the hinge member 14 and it has the same horizontal and vertical dimensions as the mirror device. It will be appreciated that the panel member prevents the back mirror surface 26 from reflecting the headlights of an oncoming car so that the driver thereof will not be blinded or distracted.

A mechanism is provided for detachably connecting the hinge member 14 to a suitable support. In the preferred embodiment shown, this support consists of the main mirror 28. Preferably the mechanism comprises a clamping mechanism 38 which includes a connecting rod 40. One end of the rod 40 extends into a loop 42 formed by the rear end of a clamping bracket 44. The loop 42 is open on one side and two horizontal strips 45 extend forwardly from the loop. At the forward ends of the strips there are two arcuate, diverging arms 46 which clampingly engage the frame 48 of the conventional rearview mirror 28. The upper strip 45 is formed with a hole through which the upper portion of a bolt or screw 50 extends. The bottom strip 45 is provided with a threaded hole which is aligned with the hole in the upper strip. The threads of the bolt 50 engage the threads in hole 52 and by turning the bolt the strips are drawn towards each other. This action causes both the loop 42 to securely grasp the rod 40 and the arms 46 to firmly engage the frame 48.

The connecting rod 40 is bent twice along its length in order to hold the mirror device in the correct position. The first section 52 of the rod extends horizontally outwardly from the loop 42. The second section 54 extends at an angle and forwardly from the first section so as to terminate close to the vertically extending, left-hand edge of the main mirror 28. The third section 56 extends vertically upwards from the second section to a joint 58 where the clamping mechanism connects to the hinge member 14. The joint 58 provides a pivot axis which extends perpendicularly to the pivot axis of the hinge member 14 when the apparatus 10 is connected to the rearview mirror 28, this pivot axis is substantially vertical. Because of the joint 58, it is possible to vary the angle of the mirror surface 24 relative to the surface of the main mirror 28. Adjustment might be desired if there are different persons driving the vehicle or if an adjustment is made to the angle of the main mirror 28. Furthermore, if the mirror device 12 is moved to the second position shown in FIG. 4, the driver will probably also wish to pivot the device about the joint 58 so as to obtain a view directly behind the vehicle. Then, when normal driving is resumed in a forward direction and the mirror device is brought to the position shown in FIG. 1, the device 12 will again be pivoted about joint 58 so that it will be at the proper angle for viewing the blind spot to the right and to the rear of the driver.

Figure 6:
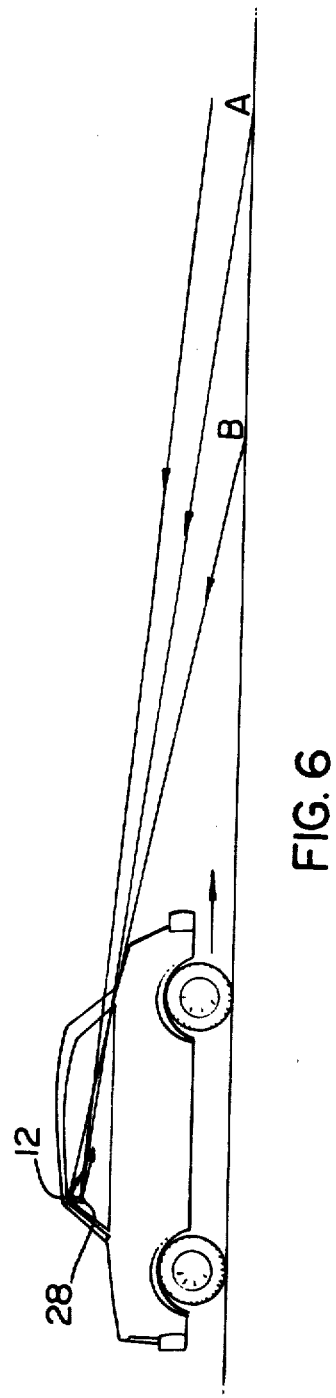
FIG. 6 is a diagrammatic illustration showing the advantage gained with the auxiliary mirror of the invention when a car is being backed up.

FIG. 6 of the drawings illustrates the increased viewing area that is available to a driver with the apparatus of the present invention. If the driver is only able to look through the main mirror 28 set at its normal driving angle, he is only able to see the area of the road or driveway that extends rearwardly from point A. However, when the mirror device 12 is used by the driver, he can see the additional area on the roadway extending between points A and B. The ability to see this additional region of the driveway could prevent a serious or costly accident from occurring.

It will be appreciated that various methods or mechanisms can be used to hold the mirror device 12 in the upper position shown in FIG. 4. One relatively easy method is to provide a close fit between the hinge pin 16 and the hinge member 14 and also a close fit between the cylinder mounts 18 and the hinge pin. In this way frictional forces will hold the mirror device 12 in any position to which the device is pivoted. Alternatively or in addition, there could be a close fit between the cylinder mounts 18 and the cylinders 20 of the hinge member 14. A positive locking mechanism could also be provided for holding the mirror device 12 in the upright position shown in FIG. 4. For example, the cylinders 20 or the cylinder mounts 18 could be made smaller so that the mirror device 12 can be slid a short distance along hinge pin 16. Recesses and cooperating locking pins or projections could be formed on the edges of cylinders 20 and cylinder mounts 18. The recesses and locking pins or projections would be engageable when the mirror device is swung to the upright position shown in FIG. 4.

The mirror device 12 with its two mirror surfaces can be constructed with two ordinary rectangular mirrors placed back to back and inserted in a suitable frame 60. The frame 60 can be constructed of metal or made of a tough, rigid plastic.

It will be appreciated that various modifications and changes could be made to the rear view apparatus as disclosed. The above description has only been provided for purposes of illustration and explanation of the invention and should not be construed as limiting the invention to the particular arrangement disclosed.

I claim:

1. A vehicle supported apparatus for providing a rear view comprising a flat mirror device having a front and back mirror surface, a hinge member extending along one edge of said mirror device, means for pivotably mounting said mirror device on said hinge member whereby said mirror device can be pivoted from a first position where said front mirror surface is viewed to a second position where said back mirror surface is viewed, means for connecting said hinge member to said vehicle including a clamping mechanism adapted to clamp onto a rearview mirror in said vehicle, and an opaque panel member rigidly connected to said hinge member and covering said back surface when said mirror device is in said first position.

2. An apparatus according to claim 1 wherein said clamping mechanism is adapted to clamp onto the top and bottom edges of said rearview mirror.

3. An apparatus according to claim 1, wherein there is a friction fit between said mounting means and said hinge member whereby frictional forces hold said mirror device in the position to which said device is pivoted.

4. A multiple mirror arrangement for providing rear views in a vehicle comprising a main rearview mirror adapted for mounting in a vehicle, an auxiliary mirror device having a front and a back mirror surface, a hinge member extending along one edge of said mirror device, said mirror device being pivotably mounted on said hinge member so that said mirror device can be pivoted from a first position where said front surface is viewed to a second position where said back surface is viewed, and means connecting said hinge member to said main mirror.

5. A multiple mirror arrangement according to claim 4 including an opaque, flat panel connected to said hinge member and covering said back mirror surface when said mirror device is in said first position.

6. A multiple mirror arrangement according to claim 4 wherein said connecting means comprises a detachable clamping mechanism clamping onto the top and bottom edges of said main mirror.

7. A multiple mirror arrangement according to claim 4 wherein a pivot joint connects said hinge member to said connecting means, the pivot axis of said joint extending generally vertically when said arrangement is mounted in a vehicle.

8. A multiple mirror arrangement according to claim 4 wherein said mirror device is held in said second position by a frictional fit between said mirror device and said hinge member.

9. A vehicle supported apparatus for providing a rear view, comprising a flat mirror device having a front and back mirror surface, a hinged member extending along one edge of said mirror device, means for pivotably mounting said mirror device on said hinge member, whereby said mirror device can be pivoted between a first lower position where said front mirror surface is viewed and a second upper position where said back mirror surface is viewed to provide a greater depth of rear view vision, and means for connecting said hinged member to said vehicle.

10. An apparatus according to claim 9, wherein said connecting means has a joint therein with a pivot axis which extends perpendicularly to the pivot axis of said hinge member, said first mentioned pivot axis being substantially vertical when said apparatus is connected to a rearview mirror in a vehicle.

11. A vehicle supported apparatus for providing a rear view comprising a flat mirror device having a front and back mirror surface, a hinge member extending along one edge of said mirror device, means for pivotably mounting said mirror device on said hinge member whereby said mirror device can be pivoted from a first position where said front mirror surface is viewed to a second position where said back mirror surface is viewed, means for connecting said hinge member to said vehicle, and an opaque panel member rigidly connected to said hinge member and covering said back surface when said mirror device is in said first position.

12. An apparatus according to claim 11 wherein said connecting means comprises a clamping mechanism adapted to clamp onto the top and bottom edges of a rearview mirror in said vehicle.

13. An apparatus according to claim 12 wherein there is a friction fit between said mounting means and said hinge member whereby frictional forces hold said mirror device in the position to which said device is pivoted and wherein said connecting means has a joint therein with a pivot axis which extends perpendicularly to the pivot axis of said hinge member, said first mentioned pivot axis being substantially vertical when said apparatus is connected to said rearview mirror in said vehicle.

* * * * *